(12) United States Patent
Nakamura (10) Patent No.: US 6,445,999 B1
(45) Date of Patent: Sep. 3, 2002

(54) NAVIGATION SYSTEM AND METHOD OF DISPLAYING A QUASI-THREE-DIMENSIONAL MAP INFORMATION

(75) Inventor: Hikaru Nakamura, Tokyo (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/955,749

(22) Filed: Sep. 19, 2001

(30) Foreign Application Priority Data

Sep. 27, 2000 (JP) ...................................... 2000-293752

(51) Int. Cl.⁷ .......................... G01C 21/30; G01C 21/32
(52) U.S. Cl. ........................ 701/208; 701/211; 701/212; 340/990; 340/995
(58) Field of Search ................................ 701/208, 209, 701/211, 212; 340/988, 990, 995

(56) References Cited

U.S. PATENT DOCUMENTS 5,406,493 A * 4/1995 Goto et al. .................. 701/208
5,832,406 A * 11/1998 Iwami et al. ................ 701/202
6,061,628 A * 5/2000 Hayashi et al. ............. 701/208

FOREIGN PATENT DOCUMENTS

EP          0 793 074 A1    9/1997

* cited by examiner

Primary Examiner—Gertrude Arthur
(74) Attorney, Agent, or Firm—Brinks Hofer Gilson & Lione (57) ABSTRACT

In displaying map information, a map drawing unit generates map drawing data with an equal scale factor and a coordinate conversion unit does not execute coordinate conversion to an area a including the screen center and the lower area thereof, and writes in a VRAM the map drawing data that maintains the scale factor as it is. Further, the coordinate conversion unit writes in the VRAM map drawing data reduced with a specific reduction scale factor only in the horizontal direction as to each of the areas on the left and right of the area a; map drawing data reduced with a specific reduction scale factor only in the vertical direction as to the area directly above the area a; and map drawing data reduced with specific reduction scale factors both in the horizontal and vertical directions as to each of the areas located obliquely left above and obliquely right above the area a. Thus, the navigation system of the invention lightens the burden of calculation processing, displays detailed information of the most important area surrounding the vehicle position, and provides a seemingly bird's-eye view display, namely, quasi-three-dimensional map information, that gives a user an extensive view.

25 Claims, 6 Drawing Sheets

NAVIGATION SYSTEM AND METHOD OF DISPLAYING A QUASI-THREE-DIMENSIONAL MAP INFORMATION

BACKGROUND OF THE INVENTION

1. Field of the Invention

The present invention relates to a navigation system that displays map information and a method of displaying map information in a quasi-three-dimensional manner.

2. Related Art

In general, a vehicle navigation system detects a present position of the vehicle, reads out map data corresponding to an area surrounding the present vehicle position from an information storage medium such as a CD, DVD, etc., and displays the map information surrounding the vehicle position on a display screen. Further, the system displays a vehicle position mark that indicates the present position of the vehicle at a specific position on the screen, and scrolls the map information of the area surrounding the vehicle putting the vehicle position mark in the center, in accordance with the travel of the vehicle, whereby a driver is able to comprehend the map information surrounding the vehicle position at any time.

Further, a recent navigation system sets an observing point with a specific position high above the vehicle position, and uses a known technique that displays the map information along the vehicle travel direction from a bird's-eye view. Thus, by providing a bird's-eye view display, the system is able to present seemingly three-dimensional map information that gives a user an extensive view. Accordingly, the system allows the user to receive more information than presenting the map information on a plane (two-dimensionally), and it becomes easier for the user to confirm the travel direction of the vehicle, which is advantageous.

In the bird's-eye view display, the map information near the lower part of the display screen is expanded to a maximum degree, and the most important map information surrounding the vehicle position, which is placed at or slightly under the screen center, reduced accordingly and becomes difficult to see, which is a problem.

Further, a precise execution of the bird's-eye view display will require calculations of the trigonometric function using the angle along the visual field direction. Because the calculations need to be executed for each display pixel, a display corresponding to the vehicle position that varies every moment will impose a very heavy burden on the calculations, which is also a problem. Also, the display positions of various mark images and character information, etc., which are superimposed on the map data, need to be calculated before executing the bird's-eye view display, which also requires the calculations of the trigonometric function, imposing a still heavier burden.

The present invention has been made in view of these circumstances, and it is an object of the invention to provide a navigation system that lightens the burden of the calculation processing and also achieves a display of the detailed information of the most important area surrounding the vehicle position.

SUMMARY OF THE INVENTION

In order to accomplish the foregoing object, the navigation system of the present invention stores in a map data storage means map data having a uniform reduction scale factor, necessary for drawing map information. On the basis of the map data read from the map data storage means, a map drawing means draws the map information in a drawing memory with regard to a first area including a screen center, and, with regard to a second area surrounding the first area, draws the map information in the drawing memory with a smaller reduction scale factor than that in the first area.

Generally, the navigation system lays out the vehicle position on the center area of the display screen or slightly lower. Therefore, by drawing the map information of the second area surrounding the first area with a smaller reduction scale factor than that for the first area including the screen center, the navigation system of the invention makes it possible to display detailed map information in the most important area surrounding the vehicle position. In the second area remote from the vehicle position, the system makes it possible to display map information including more remote information.

Since the system draws the map information corresponding to the second area by very simple calculations that reduce the map information on the basis of the specific reduction scale factors, the system does not require complicated calculation processing using the trigonometric function as in case of the bird's-eye view display, and thereby reduces the burden of the processing to a great extent. Further, the system uses map data having a uniform reduction scale factor, which is the same as the map data that a general navigation system uses. Therefore, it does not need to create new map data for drawing the map information, and is able to use the existing map data as it is, which is advantageous.

It is preferable that the first area is rectangular, including the screen center and the lower area thereof. The map drawing means draws the map information in the drawing memory with a reduction scale factor only in the horizontal direction as to areas on both sides of the first area, with a reduction scale factor only in the vertical direction as to an area directly above the first area, and with reduction scale factors in both the vertical and horizontal directions as to the slant upper areas relative to the first area. Since the system reduces the map information in this manner, it is able to display quasi-three-dimensional map information having a feeling of depth, resembling the bird's-eye view display.

According to the method of displaying quasi-three-dimensional map information of the present invention, map data corresponding to an area wider than an area required for displaying the map information with an equal scale factor is read. Next, the map information is drawn, setting a horizontal reduction scale factor for areas on both sides of a center area to a first value smaller than a first reference value, while bringing the horizontal reduction scale factor for the center area into correspondence with the first reference value and bringing a vertical reduction scale factor for an area lower than the center area into correspondence with a second reference value, and setting the vertical reduction scale factor for an area above the lower area to a second value smaller than the second reference value. Finally, the drawn map information drawn is displayed on the display screen.

Thus, with regard to the specific area lower than the center area of the display screen, since the map information can be drawn with the equal scale factor, setting the vehicle position in this specific area achieves a display of detailed map information in the area surrounding the vehicle position. In setting the area where the map information is drawn with the equal scale factor in the center, as to the areas on both sides of this area, the map data are reduced in the horizontal direction. As to the area above this center area, the map data are reduced in the vertical direction. As to the areas located obliquely above this center area, the map data are reduced in both the horizontal and vertical directions. Therefore, map information that allows a user to view remote places, that is, the quasi-three-dimensional map information, can be expressed through simple calculation processing.

BRIEF DESCRIPTION OF THE DRAWINGS

Preferred embodiments of the present invention will be described in detail based on the followings, wherein.

DETAILED DESCRIPTION OF PREFERRED EMBODIMENTS

One embodiment of a navigation system to which the present invention is applied will be described with reference to the accompanying drawings.

Figure 1:
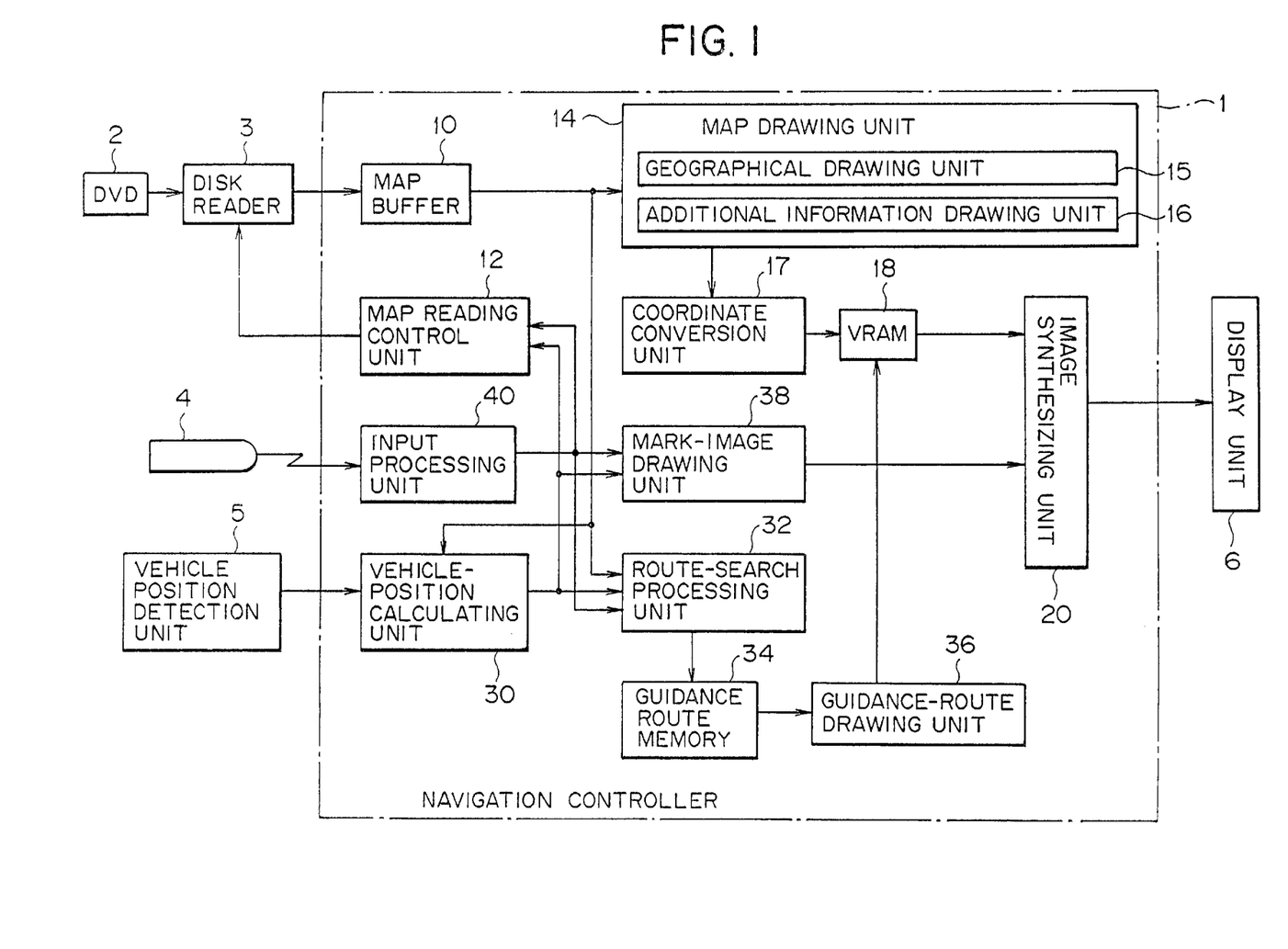
FIG. 1 is a block diagram illustrating the general construction of a navigation system relating to one embodiment.

FIG. 1 is a block diagram illustrating the general construction of the navigation system relating to one embodiment. The navigation system includes a navigation controller 1, a DVD 2, a disk reader 3, a remote control unit 4, a vehicle position detection unit 5, and a display unit 6.

The navigation controller 1 controls the overall operation of the navigation system. Generally, the navigation controller 1 comprises a CPU, ROM, RAM, etc., and executes a specified program stored in the ROM or the like to achieve the function thereof. The detailed construction of the navigation controller 1 will be described later. Here, the program to achieve the function of the navigation controller 1 may be stored in the DVD 2, so that the program can be read out each time the navigation system is started.

The DVD 2 is an information storage medium that houses map data necessary for displaying maps, searching routes, etc. Specifically, the DVD 2 stores the map data of a rectangular sheet drawing divided by predetermined longitude and latitude as the unit, and the map data of each sheet drawing can be specified and read out by designating the number of the sheet drawing.

Further, the map data of each sheet drawing contains (1) a "drawing unit" composed of various data for displaying map information, (2) a "road unit" composed of various data for processing map matching, route searching, route guiding, etc., and (3) an "intersection unit" composed of various data for presenting detailed information of intersections, and so forth.

The map data contained in the drawing unit generally are made up with an equal scale factor, that is, the vertical and horizontal reduction scale factors are set to one and the same value. This embodiment applies a specified coordinate conversion processing (detailed later) to the map data having the same scale factor, and thereby draws the map information of the peripheral area with a further reduced scale factor when compared to that in drawing the area including the screen center.

The disk reader 3 has one or more sheets of the DVD 2 loaded and reads out map data from the DVD 2 under the control of the navigation controller 1. Here, the disk loaded may not necessarily be a DVD; it may be a CD. The disk reader 3 also may be configured so that a DVD and a CD can selectively be loaded thereon.

The remote control unit 4 is furnished with various operating keys, such as a vertically/horizontally moving cursor key and keys for setting items at the cursor positions on the display screen, etc., and it transmits an infrared signal according to a key operation toward the navigation controller 1. For example, the remote control unit 4 is able to set the reduction scale factor of the map information presented on the screen of the display unit 6.

The vehicle position detection unit 5 is furnished with a GPS receiver, an azimuth sensor, a distance sensor, etc., and detects a vehicle position (longitude, latitude) at a specific timing and outputs the detected result.

The display unit 6 displays various images of the map information and the like of the area surrounding the vehicle position, on the basis of the drawing data provided from the navigation controller 1.

Next, the detailed construction of the navigation controller 1 will be described. The navigation controller 1 shown in FIG. 1 includes a map buffer 10, a map reading control unit 12, a map drawing unit 14, a coordinate conversion unit 17, a VRAM 18, an image synthesizing unit 20, a vehicle-position calculating unit 30, a route-search processing unit 32, a guidance route memory 34, a guidance-route drawing unit 36, a mark-image drawing unit 38, and an input processing unit 40.

The map buffer 10 temporarily stores the map data read out from the DVD 2 by the disk reader 3. The map reading control unit 12 outputs to the disk reader 3 a readout request for the map data in a specific area, in correspondence with the vehicle position calculated by the vehicle-position calculating unit 30 and the request from the input processing unit 40 and so forth.

The map drawing unit 14 generates map drawing data required for the display of map information on the basis of the map data stored in the map buffer 10, and includes a geographical drawing unit 15 and an additional information drawing unit 16. The geographical drawing unit 15 generates geographical drawing data for illustrating geographical features such as roads, rivers and the like, appearing on the map. The additional information drawing unit 16 generates additional information drawing data for displaying various kinds of additional information on the map, for example, marks indicating various kinds of facilities such as public facilities and convenience stores, character strings indicating the names of the facilities and the place names thereof, and so forth.

The coordinate conversion unit 17 applies a specified coordinate conversion processing to the map drawing data generated by the map drawing unit 14, generates map drawing data that artificially expresses the three-dimensional map information, and writes the data in the VRAM 18. Specifically, the coordinate conversion unit 17 executes the specified coordinate conversion processing on the geographical drawing data generated by the geographical drawing unit 15, and writes in the VRAM 18 geographical drawing data after the coordinate conversion processing. Further, the coordinate conversion unit 17 executes a specified coordinate conversion processing on the drawing position of the additional information drawing data generated by the additional information drawing unit 16, and overwrites the result in the VRAM 18. The coordinate conversion processing executed by the coordinate conversion unit 17 will be detailed later.

The VRAM 18 temporarily stores the map drawing data after the specified coordinate conversion processing executed by the coordinate conversion unit 17 and guidance route drawing data generated by the guidance-route drawing unit 36.

The image synthesizing unit 20 superimposes the drawing data provided from the mark-image drawing unit 38 on the map drawing data read from the VRAM 18 in correspondence with the vehicle position to thereby synthesize the images, and outputs the synthesized drawing data to the display unit 6.

The vehicle-position calculating unit 30 calculates the vehicle position and azimuth on the basis of the data provided from the vehicle position detection unit 5. If the calculated vehicle position does not exist on a road in the map data, the vehicle-position calculating unit 30 will execute the map matching processing to correct the vehicle position.

The route-search processing unit 32 searches for a travel route that connects the start point and the destination point designated by the user under a specific condition. As the guidance route, it sets a travel route that minimizes the cost under various kinds of conditions, for example, under the condition of the shortest distance and/or the shortest time. The guidance route memory 34 stores the data representing the contents of the guidance route (guidance route data) set by the route-search processing unit 32.

The guidance-route drawing unit 36 selects data for the map information written in the VRAM 18 at that moment out of the guidance route data that are set by the route-search processing unit 32 and stored by the guidance route memory 34, and generates the guidance route drawing data to superimpose the guidance route on the map information for display.

The mark-image drawing unit 38 generates drawing data for displaying a specific vehicle position mark at the vehicle position after the map matching processing, and for displaying a specific cursor mark at the cursor position.

The input processing unit 40 provides commands to the relevant units inside the navigation controller 1 for executing the operations corresponding to various operational instructions transmitted from the remote control unit 4.

The map buffer 10 corresponds to a map data storage means, the map drawing unit 14 and coordinate conversion unit 17 correspond to a map drawing means, and the VRAM 18 corresponds to a drawing memory.

The navigation system in this embodiment possesses the configuration as described above. Next, the contents of the coordinate conversion processing performed by the coordinate conversion unit 17 will be described in detail.

Figure 2:
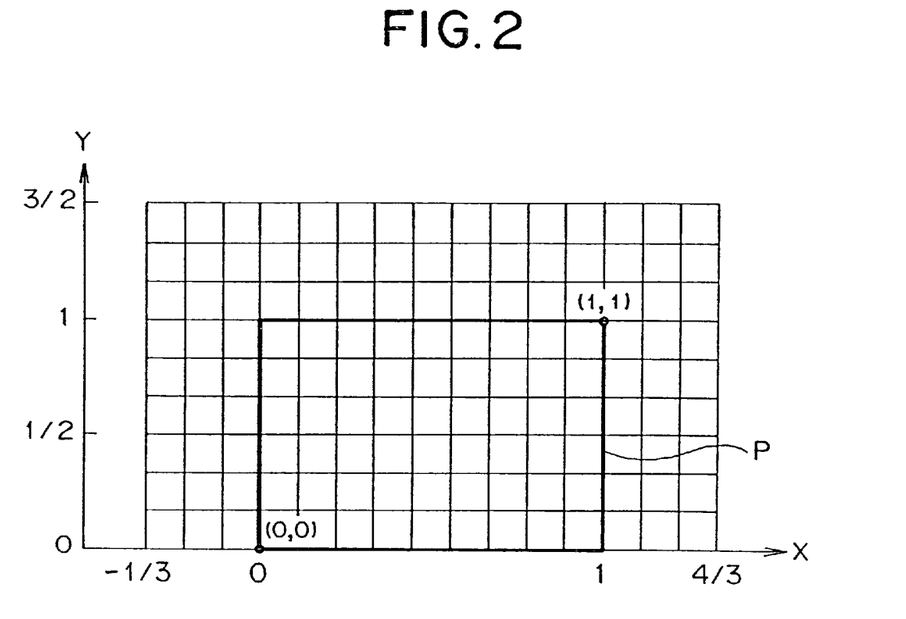
FIG. 2 is a chart explaining an aspect of coordinate conversion processing by a coordinate conversion unit.
Figure 3:
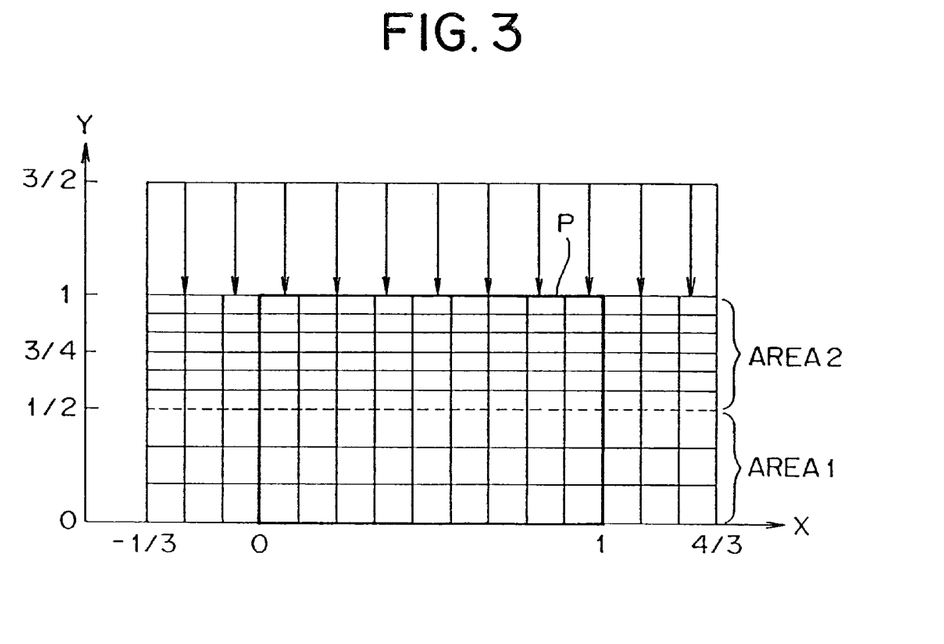
FIG. 3 is a chart explaining an aspect of coordinate conversion processing by the coordinate conversion unit.
Figure 4:
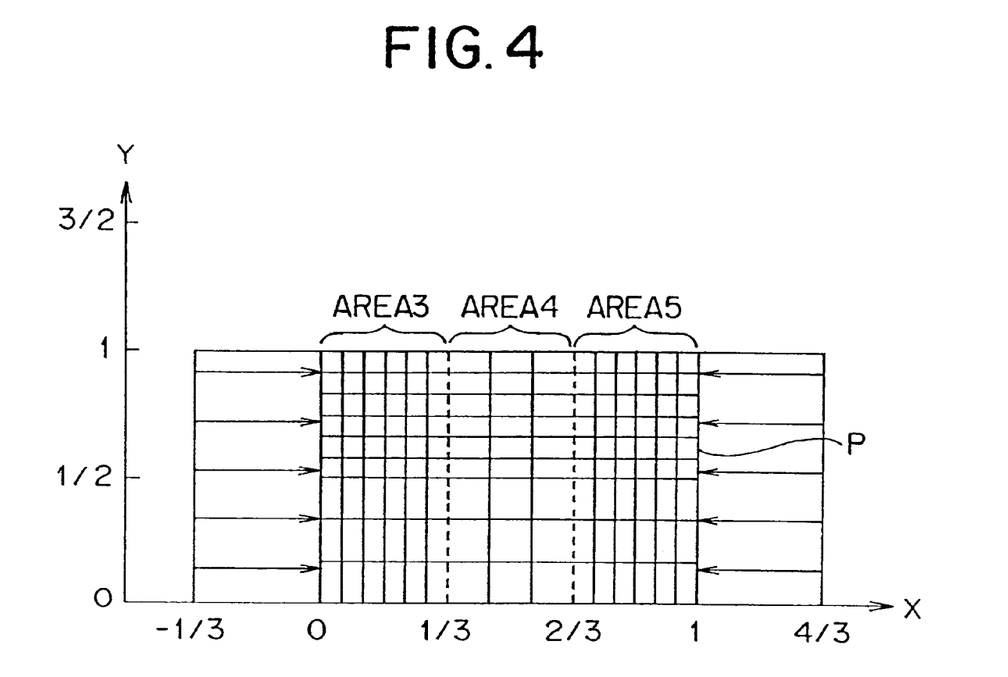
FIG. 4 is a chart explaining an aspect of coordinate conversion processing by the coordinate conversion unit.

FIG. 2 through FIG. 4 explain the coordinate conversion processing performed by the coordinate conversion unit 17. First, the geographical drawing unit 15 in the map drawing unit 14 generates the geographical drawing data. As a premise, the geographical drawing data are drawn in a specific area wider than a rectangular display area P corresponding to the display screen of the display unit 6.

The X-axis and the Y-axis are set in the geographical drawing data. Further, the lengths of each side of the display area P on the display unit 6 are normalized, and on the XY coordinate system, the left lower vertex of the display area P is brought in correspondence with the coordinate position (0, 0), and the right upper vertex is brought in correspondence with the coordinate position (1, 1). In general, the X-axis and the Y-axis are expressed to intersect at the position (X, Y)=(0, 0). However, in FIG. 2 through FIG. 4, the intersection of the X-axis and the Y-axis are displaced to clarify explanation.

As shown in FIG. 3, (1) the area $0 \leq Y < 1/2$ is defined as "area 1", and (2) the area $1/2 \leq Y \leq 1$ is defined as "area 2". As shown in FIG. 3, the geographical drawing data in the area 2 are converted by the coordinate conversion processing along the Y-axis direction with a specific reduction scale factor $\alpha(0<\alpha<1)$. Specifically, the coordinate value (X', Y') after the coordinate conversion processing along the Y-axis direction can be attained by the following expression.

$$(X', Y') = (X, 1/2 + \alpha(Y - 1/2))$$

FIG. 3 illustrates the state of the coordinate conversion processing of the geographical drawing data in setting the reduction scale factor $\alpha$ to "1/2". For example, the geographical drawing data of the original coordinate points (0, 1) and (0, 3/2) are converted into the coordinate points (0, 3/4) and (0, 1), respectively. With regard to the geographical drawing data of the other coordinate points, the coordinate conversion processing is carried out in the same manner. As the result, the geographical drawing data having the coordinate data in the Y-axis direction reduced to 1/2 are to be drawn within the area 2.

Next, as shown in FIG. 4, (1) the area $0 \leq X \leq 1/3$ is defined as "area 3", (2) the area $1/3 < X < 2/3$ is defined as "area 4", and (3) the area $2/3 \leq X \leq 1$ is defined as "area 5". As shown in FIG. 4, the geographical drawing data in area 3 are converted by the coordinate conversion processing along the X-axis direction with a specific reduction scale factor $\beta(0<\beta<1)$. In the same manner, the geographical data in area 5 are converted by the coordinate conversion processing along the X-axis direction with a specific reduction scale factor $\gamma$ $(0<\gamma<1)$.

Specifically, the coordinate value (X", Y") after the coordinate conversion processing along the X-axis direction can be obtained by the following expressions.

$$(X'', Y'') = (\beta(X - 1/3) + 1/3, Y) \quad \text{(area 3)}$$

$$(X'', Y'') = (2/3 + \gamma(X - 2/3), Y) \quad \text{(area 5)}$$

FIG. 4 illustrates the state of the coordinate conversion processing of the geographical drawing data in setting the reduction scale factors $\beta$ and $\gamma$ each to "1/2". For example, in area 3, the geographical drawing data of the original coordinate points (−1/3, 0) and (0, 0) are converted into the coordinate points (0, 0) and (1/6, 0), respectively. With regard to the geographical drawing data of the other coordinate points, the coordinate conversion processing is carried out in the same manner. As the result, the geographical drawing data having the coordinate data in the X-axis direction reduced to 1/2 are to be drawn within area 3.

In the same manner, in area 5, the geographical drawing data of the original coordinate points (1, 0) and (4/3, 0) are converted into the coordinate points (5/6, 0) and (1, 0), respectively. With regard to the geographical drawing data of the other coordinate points, the coordinate conversion processing is carried out in the same manner. As the result, the geographical drawing data having the coordinate data in the X-axis direction reduced to 1/2 are to be drawn within area 5.

Further, the coordinate conversion unit 17 carries out the same coordinate conversion processing to thereby acquire the displayed position of the additional information drawing data drawn by the additional information drawing unit 16 in the map drawing unit 14, and superimposes the additional information drawing data on the geographical drawing data after the coordinate conversion processing. Therefore, the VRAM 18 is in the state that the geographical drawing data and the additional information drawing data are superimposed, that is, the map drawing data are written in.

Figure 5:
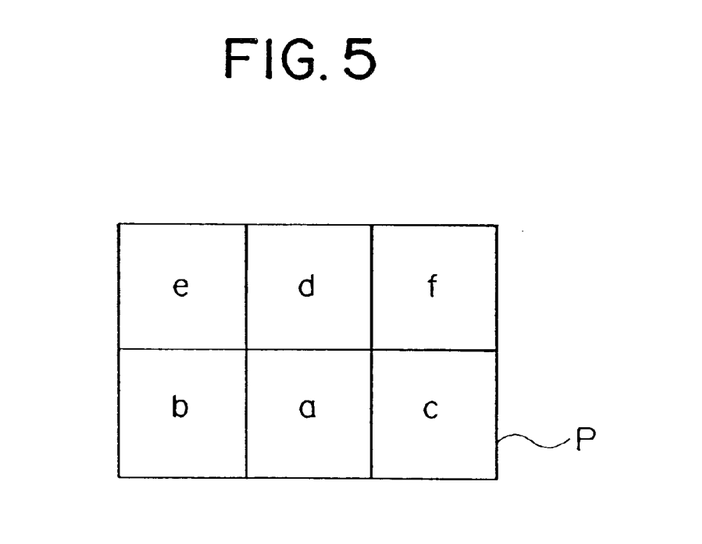
FIG. 5 is a chart explaining the reduction scale of the map drawing data that are written in a VRAM after a specific coordinate conversion processing.

FIG. 5 explains the reduction scale of the map drawing data that are written in the VRAM 18 after the specific coordinate conversion processing. The area a shown in the drawing includes the screen center and the area underneath. The map drawing data in this area a are drawn with a specific equal scale factor $\delta$ that is voluntarily set by the user through the remote control unit 4. With regard to the area d directly above the area a, the data are drawn with the specific reduction scale factor a only in the vertical direction. With regard to the area b and the area c located on both sides of the area a, the data are drawn with the specific reduction scale factor $\beta$ or $\gamma$ only in the horizontal direction. With regard to the area e and the area f located obliquely above the area a, the data are drawn with the specific reduction scale factors $\alpha$ (in the vertical direction), and $\beta$, $\gamma$ (in the horizontal direction).

Here, the area a shown in FIG. 5 corresponds to "a first area", and the area b through the area f correspond to "a second area". The equal scale factor $\delta$ set by the user corresponds to "a first reference value" and "a second reference value", the reduction scale factors $\beta$ and $\gamma$ correspond to "a first value", and the reduction scale factor a corresponds to "a second value".

Figure 6:
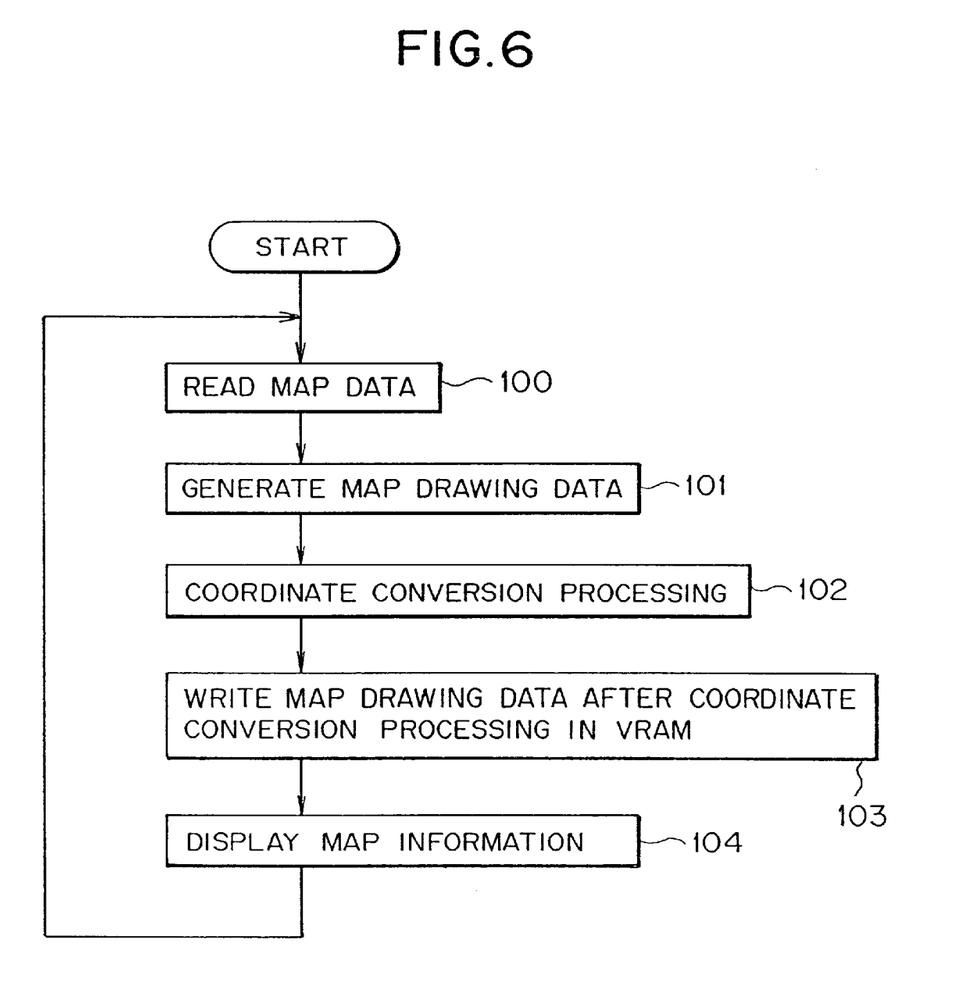
FIG. 6 is a flow chart illustrating an operating procedure while displaying map information.

Next, the operation of the navigation system in displaying the map information for the area surrounding the vehicle position will be described in detail. FIG. 6 is a flow chart illustrating the operating procedure in displaying the map information.

The map reading control unit 12 sends a readout request for the map data in a specific area to the disk reader 3, in correspondence with the vehicle position calculated by the vehicle-position calculating unit 30. In response, the disk reader 3 reads the map data for the specific area from the DVD 2, and stores the data in the map buffer 10 (Step 100). Specifically, Step 100 reads out the map data required for displaying a specific area wider than the display area P (see FIG. 2) that covers the display screen of the display unit 6, when the map data are displayed with the equal scale factor.

Next, the map drawing unit 14, using the map data read from the map buffer 10, generates the map drawing data corresponding to the area surrounding the vehicle position (Step 101). As the map drawing unit 14 generates the map drawing data, the coordinate conversion unit 17 executes the specified coordinate conversion processing to the generated map drawing data (Step 102), and the VRAM 18 stores the map drawing data after the coordinate conversion processing (Step 103). The specific operation of the coordinate conversion processing performed at Step 102 is as explained above.

Next, the image synthesizing unit 20 reads the map drawing data of the area corresponding to one screen from the VRAM 18, synthesizes the map drawing data read from the VRAM 18 with the drawing data generated by the mark-image drawing unit 38, and provides the synthesized image to the display unit 6. As a result, the map information is displayed on the image screen of the display unit 6 (Step 104). After that, the system returns to Step 100, reads map data corresponding to a new vehicle position, and repeats the same processing thereafter.

Figure 7:
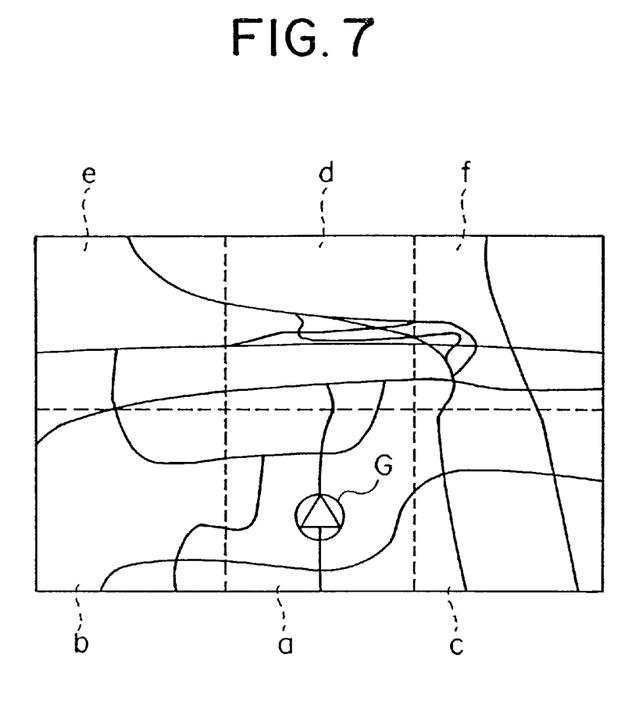
FIG. 7 is a chart illustrating a display example of map information.
Figure 8:
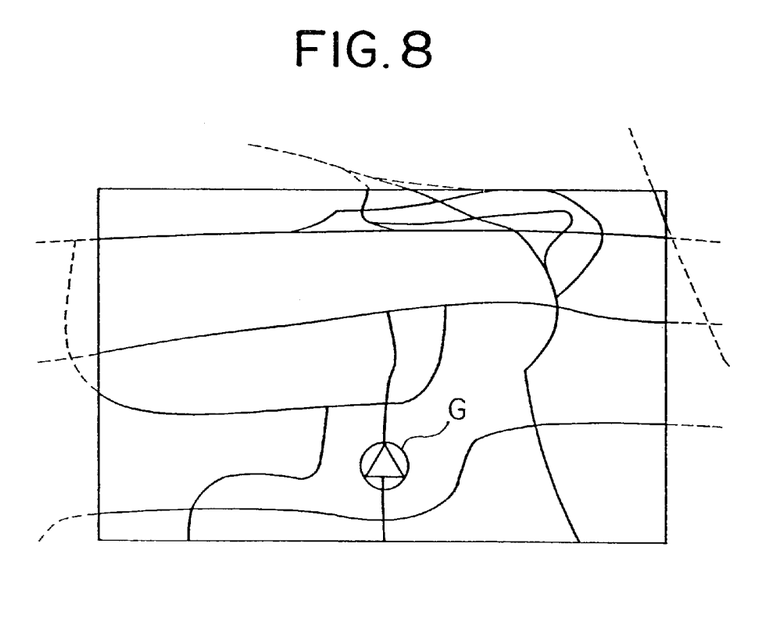
FIG. 8 is a chart illustrating a display example of map information by a conventional navigation system.

FIG. 7 illustrates an example of the display of map information by the navigation system of this embodiment. FIG. 8 illustrates an example of the display of map information by a conventional navigation system, where the vehicle position is set at the same position as in FIG. 7 for comparison, and the map information corresponding to the area surrounding the vehicle position is drawn in a plane (two-dimensionally) as an example. Further, in FIG. 8, some parts of the roads lying outside the display area of the display unit 6 are illustrated by the dotted lines, in order to clarify the difference from FIG. 7.

As shown in FIG. 7, in the area a corresponding to the area surrounding the vehicle position G, the map information is not reduced in the vertical and horizontal directions. Accordingly, the map information in the area surrounding the vehicle position can be displayed in detail in the same manner as in the case of the map information displayed two-dimensionally in FIG. 8. Map information reduced in the horizontal direction is displayed in the areas b, c; map information reduced in the vertical direction is displayed in the area d; and map information reduced in both the vertical and horizontal directions is displayed in the areas e, f. Therefore, in comparison with the map information displayed two-dimensionally as shown in FIG. 8, the system of this embodiment is able to display map information including still more remote information. When viewing the map information as a whole, in comparison with the map information corresponding to the vehicle position G, the map information of the surrounding areas is reduced in the display, thereby presenting artificial three-dimensional map information having a feeling of depth, which resembles a bird's-eye view display.

Thus, the navigation system of this embodiment executes the specific coordinate conversion processing on the map drawing data, and thereby draws the map information of the area b through the area f surrounding the area a with diminished reduction scale factors, compared to the scale factor for the area a including the screen center. Therefore, the system is able to display detailed map information with regard to the most important area a surrounding the vehicle position, and with regard to the area b through the area f remote from the vehicle position, it is also able to display map information including information of still more remote areas. Further, since the system reduces the map drawing data through simple calculations using the specific reduction scale factors $\alpha$, $\beta$, $\gamma$, the system is able to display artificial three-dimensional map information without a complicated calculation processing using the trigonometric function as in case of the bird's-eye view display, which relieves the burden of calculation processing to a great extent.

Naturally, the invention is not limited to the aforementioned embodiment, and various changes and modifications are possible within the spirit and scope of the invention. For example, the reduction scale factors $\alpha$, $\beta$, $\gamma$ are set to 1/2 in this embodiment, however the setting values may be otherwise. Although the setting values for the reduction scale factors α, β, γ are made uniform in this embodiment, it is not necessarily required to make the setting values uniform for the reduction scale factors, and they may be set to values different from each other.

Further, in the described embodiment, the peripheral area surrounding the area a corresponding to the vehicle position (the area including the screen center) is divided into five areas of the area b through the area f. However, the system may be designed to have an increased number of divisions of the peripheral area surrounding the screen center, and display the map information with different reduction scale factors in correspondence with each of the divided areas.

Figure 9:
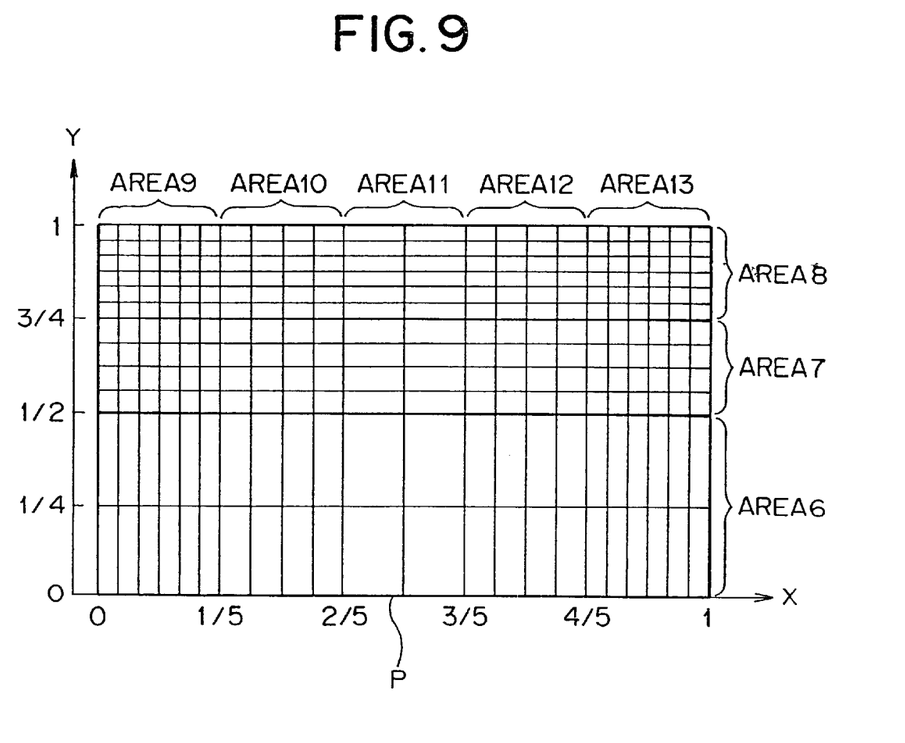
FIG. 9 is a chart explaining the contents of the coordinate conversion processing in a modified example, in which the division number of the peripheral area surrounding the screen center is increased.

FIG. 9 explains the coordinate conversion processing in a modified embodiment, in which the number of divisions of the peripheral area surrounding the screen center is increased. With regard to the vertical direction, this modified embodiment sets three areas, defining (1) the area $0 \leq Y < 1/2$ as "area 6", (2) the area $1/2 \leq Y < 3/4$ as "area 7", and (3) the area $3/4 \leq Y < 1$ as "area 8". The geographical drawing data in the area 7 are attained by the coordinate conversion processing having the reduction scale factor α set to 1/2 along the Y-axis direction, and the geographical drawing data in the area 8 are attained by the coordinate conversion processing having the reduction scale factor α set to 1/3 along the Y-axis direction.

Similarly, with regard to the horizontal direction, this modified embodiment sets five areas, defining (1) the area $0 \leq X < 1/5$ as "area 9", (2) the area $1/5 \leq X < 2/5$ as "area 10", (3) the area $2/5 \leq X < 3/5$ as "area 11", (4) the area $3/5 \leq X < 4/5$ as "area 12", (5) the area $4/5 \leq X < 1$ as "area 13". Thus, the geographical drawing data in the area 10 and the area 12 are attained by the coordinate conversion processing having the reduction scale factors β and γ set to 1/2 along the X-axis direction, and the geographical drawing data in the area 9 and the area 13 are attained by the coordinate conversion processing having the reduction scale factors β and γ set to 1/3 along the X-axis direction.

Figure 10:
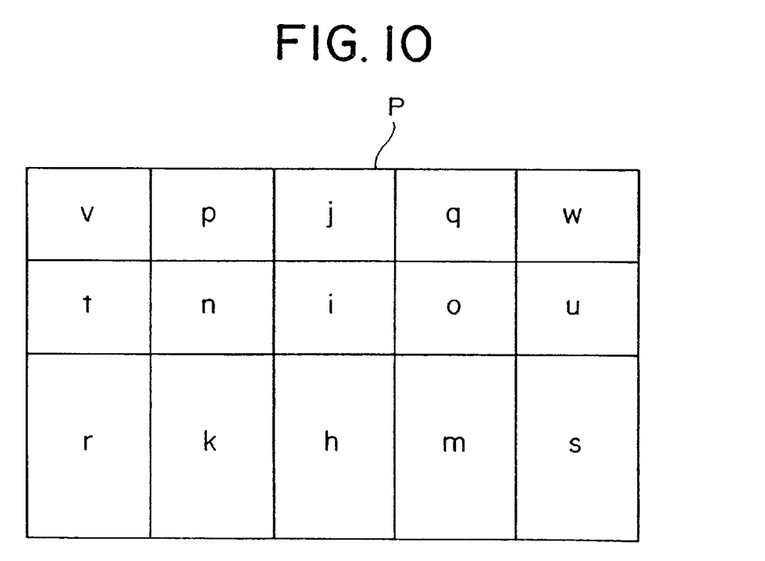
FIG. 10 is a chart explaining the reduction scale of the map drawing data that are written in a VRAM after a specific coordinate conversion processing, in the modified example shown in FIG. 9.

FIG. 10 explains the reduction scale of the map drawing data that are written in the VRAM 18 after the specific coordinate conversion processing in the embodiment example shown in FIG. 9. The area h shown in FIG. 10 includes the screen center and the area underneath. The map drawing data in this area h, in the same manner as for the area a in the foregoing embodiment, are drawn with a specific equal scale factor 6 that is voluntarily set by the user through the remote control unit 4.

With regard to the area i directly above the area h, the data are drawn with the reduction scale factor 1/2 only in the vertical direction. With regard to the area j directly above the area i, the data are drawn with the reduction scale factor 1/3 only in the vertical direction. With regard to the area k and the area m on both sides of the area h, the data are drawn with the reduction scale factor 1/2 only in the horizontal direction. With regard to the area r on the left of the area k and the area s on the right of the area mn, the data are drawn with the reduction scale factor 1/3 only in the horizontal direction.

With regard to the area n and the area o located obliquely above area h, the data are drawn with the reduction scale factor 1/2 in both the vertical and horizontal directions. With regard to the area p directly above the area n and the area q directly above the area o, the data are drawn with the reduction scale factor 1/3 in the vertical direction and the reduction scale factor 1/2 in the horizontal direction. With regard to the area t on the left of the area n and the area u on the right of the area o, the data are drawn with the reduction scale factor 1/2 in the vertical direction and the reduction scale factor 1/3 in the horizontal direction. With regard to the area v directly above the area t and the area w directly above the area u, the data are drawn with the reduction scale factor 1/3 in both the vertical and horizontal directions.

Thus, the number of divisions of the peripheral area surrounding the area h including the screen center is increased in this example, and the map information is displayed with a gradual reduction in accordance with the distance from the screen center. Therefore, this modified embodiment is able to present artificial three-dimensional map information having a feeling of depth, which is similar to the bird's-eye view display. Also in this case, since the coordinate conversions in these areas can be carried out by simple calculations using the specific reduction scale factors, the map information can be displayed with an enhanced feeling of presence without much increase in the amount of calculations.

The aforementioned embodiments utilize the head-up display method of map information that shows the travel direction of the vehicle always upward. However, the invention is not limited to this, and the north-up display method wherein the map information is displayed with the northern direction always upward may be adopted as the display method.

Further, the aforementioned embodiments are examples wherein the present invention is applied to a navigation system. However, the invention is not limited to this, and it may be applied to a personal computer that executes a specific map information display program to which the invention is applied, whereby the same function can be achieved.

As mentioned above, the navigation system of the invention is able to display detailed map information of the most important area surrounding the vehicle position, and with regard to the second area corresponding to an area remote from the vehicle position, it is able to display map information including more remote map information. Further, since the system draws the map information corresponding to the second area by very simple calculations that reduce the map information on the basis of the specific reduction scale factors, it does not require a complicated calculation processing as in case of the bird's-eye view display, and thereby reduces the burden of the processing to a great extent.

Further, in the method of displaying the quasi-three-dimensional map information according to the invention, as to a specific area on the display screen, which is located near the center in the horizontal direction and in the lower area in the vertical direction, the map information is drawn with an equal scale factor. Accordingly, it is possible to display detailed map information for the area surrounding the vehicle position by bringing the specific area or the area adjacent to that into correspondence with the vehicle position.

Further, with regard to the areas on the sides of the area wherein the map information is displayed with the equal scale factor, the map data are drawn with a specific reduction scale factor in the horizontal direction. With regard to the area above that area, the map data are drawn with a specific reduction scale factor in the vertical direction. With regard to the areas obliquely above that area, the map data are drawn with specific reduction scale factors in both the vertical and horizontal directions. Therefore, map information that allows a user to look out over remote places, that is, the quasi-three-dimensional map information, can be expressed through simple calculation processing.

What is claimed is:

1. A navigation system comprising:
 a map data storage medium that stores map data having a uniform reduction scale factor for drawing map information;
 a drawing memory corresponding to a display screen; and
 a map drawing unit that reads map data from the map data storage medium, draws map information in the drawing memory with regard to a first area including a screen center and a lower part thereunder, and draws map information in the drawing memory with a smaller reduction scale factor than that in the first area, with regard to a second area surrounding the first area.

2. A navigation system as claimed in claim 1, wherein:
 the first area is rectangular; and
 the map drawing unit draws map information in the drawing memory with a reduction scale factor only in the horizontal direction with regard to areas on both sides relative to the first area, with a reduction scale factor only in the vertical direction with regard to an area above the first area, and with reduction scale factors in both the vertical and horizontal directions with regard to areas obliquely above the first area.

3. A navigation system as claimed in claim 2, wherein the reduction scale factor for the areas on both sides relative to the first area is different from the reduction scale factor for the area above the first area.

4. A navigation system as claimed in claim 2, wherein the reduction scale factor for the areas on both sides relative to the first area is equal to the reduction scale factor for the area above the first area.

5. A navigation system as claimed in claim 2, wherein the reduction scale factor for the area to the right of the first area is different from the reduction scale factor for the area to the left of the first area.

6. A navigation system as claimed in claim 2, wherein the map drawing unit divides the areas on both sides of the first area into plural areas, and with regard to the divided areas, sets the reduction scale factors gradually smaller as the divided areas become more distant from the first area.

7. A navigation system as claimed in claim 2, wherein the map drawing unit divides the area above the first area into plural areas, and with regard to the divided areas, sets the reduction scale factors gradually smaller as the divided areas become more distant from the first area.

8. A navigation system as claimed in claim 2, wherein the map drawing unit:
 divides the areas on both sides of the first area into plural areas, and with regard to the divided areas, sets the reduction scale factors gradually smaller as the divided areas become more distant from the first area;
 divides the area above the first area into plural areas, and with regard to the divided areas, sets the reduction scale factors gradually smaller as the divided areas become more distant from the first area; and
 with regard to the areas obliquely above the first area, draws map information in the drawing memory with gradually decreasing scale factors in both the vertical and horizontal directions as the divided areas become more distant from the first area.

9. A navigation system as claimed in claim 2, wherein the map drawing unit draws map information in the drawing memory with a head-up display that includes a vehicle position in the first area and sets the travel direction of the vehicle upward on the image screen.

10. A navigation system as claimed in claim 2, wherein the map drawing unit draws the map information in the drawing memory with a north-up display that includes a vehicle position in the first area and sets the northern direction upward on the image screen.

11. A navigation system as claimed in claim 2, wherein the first area is drawn with an equal scale factor that is set by a user.

12. A method of displaying quasi-three-dimensional map information, comprising:
 reading map data corresponding to an area wider than an area required for displaying the map information with an equal scale factor;
 drawing the map information, as to a horizontal reduction scale factor for a display screen, by setting a reduction scale factor for a first area to a first reference value, setting a reduction scale factor for areas on the sides of the first area to a first value smaller than the first reference value, and as to a vertical reduction scale factor for the display screen, by setting a reduction scale factor for a lower area to a second reference value, setting a reduction scale factor for an area above the lower area to a second value smaller than the second reference value; and
 displaying the drawn map information on the display screen.

13. A method of displaying quasi-three-dimensional map information, as claimed in claim 12, wherein the first value and the second value are set to the same value.

14. A method of displaying quasi-three-dimensional map information, as claimed in claim 12, wherein the first value and the second value are set to different values.

15. A method of displaying quasi-three-dimensional map information, as claimed in claim 12, the method further comprising:
 dividing the areas on the sides of the first area into plural areas, and with regard to the divided areas, setting the horizontal reduction scale factors gradually smaller as the divided areas become more distant from the first area; and
 dividing the area above the lower area into plural areas, and with regard to the divided areas, setting the vertical reduction scale factors gradually smaller as the divided areas become more distant from the lower area.

16. A method of displaying quasi-three-dimensional map information, as claimed in claim 12, wherein the first area and the lower area are drawn with equal scale factors that are set by a user.

17. A method of displaying map information, comprising:
 reading map data for an area to be displayed, where the map data are defined with respect to an X, Y coordinate system;
 identifying a first area within the area to be displayed;
 drawing map information based on the map data, where map information for the first area is drawn in accordance with a first scale factor in at least one of the coordinate directions, and map information for at least part of a second area within the area to be displayed that is outside the first area is drawn with a scale factor smaller than the first scale factor in the at least one coordinate direction; and
 displaying the drawn map information for the area to be displayed.

18. A method as claimed in claim 17, wherein the first scale factor is set by a user.

19. A method as claimed in claim 17, wherein the drawn map information is displayed in one of a head-up display, in which a vehicle position is included in the first area and a travel direction of the vehicle is upward, and a north-up display, in which a vehicle position is included in the first area and the northern direction in the displayed map information is upward.

20. A method as claimed in claim 17, wherein the first area is substantially centrally located with respect to at least one coordinate direction within the area to be displayed.

21. A method as claimed in claim 20, wherein the first area is substantially centrally located with respect to the X coordinate direction.

22. A method as claimed in claim 21, wherein the first area is located in the lower part of the area to be displayed.

23. A method as claimed in claim 17, wherein the second area is drawn, with respect to a first coordinate direction, with one or more scale factors smaller than a scale factor for the first area, and the second area is drawn, with respect to a second coordinate direction, with one or more scale factors smaller than a scale factor for the first area.

24. A method as claimed in claim 23, wherein the scale factors in the second area for each coordinate direction are set to be gradually smaller for areas within the second area that become more distant from the first area.

25. A method as claimed in claim 17, wherein the first scale factor is set to one.

\* \* \* \* \*